United States Patent [19]

Taylor

[11] 3,961,131
[45] June 1, 1976

[54] DISC RECORD LOCKED GROOVE ESCAPE APPARATUS

[75] Inventor: Byron Kent Taylor, Indianapolis, Ind.

[73] Assignee: RCA Corporation, New York, N.Y.

[22] Filed: Mar. 27, 1975

[21] Appl. No.: 562,730

[30] Foreign Application Priority Data
Feb. 28, 1975 United Kingdom............... 8405/75

[52] U.S. Cl. .................. 178/6.6 R; 178/6.6 DD; 178/6.6 FS; 179/100.4 D; 179/100.4 R; 274/13 R; 360/10
[51] Int. Cl.² .................. H04N 5/76; G11B 3/10; G11B 3/38; G11B 17/00
[58] Field of Search ........ 178/6.6 R, 6.6 A, 6.6 DD, 178/6.6 FS, 6.7 A; 360/10; 179/100.3 V, 100.1 B, 100.4 R, 100.4 D, 100.41 G; 274/13 R, 14, 15 R

[56] References Cited
UNITED STATES PATENTS

| | | | |
|---|---|---|---|
| 2,921,992 | 1/1960 | Bick | 179/100.4 D |
| 3,437,763 | 4/1969 | Anderson et al. | 179/100.4 D |
| 3,711,641 | 1/1973 | Palmer | 178/6.6 DD |
| 3,767,848 | 10/1973 | Schuller | 178/6.6 R |
| 3,854,015 | 12/1974 | Janssen | 179/100.3 V |
| 3,911,211 | 10/1975 | Rennick | 178/6.6 R |

Primary Examiner—Raymond F. Cardillo, Jr.
Attorney, Agent, or Firm—Eugene M. Whitacre; William H. Meagher; Dilip A. Kulkarni

[57] ABSTRACT

In a system for playing back prerecorded signals from a spirally grooved disc record by a groove-engaging signal pickup secured to a pickup arm when relative speed is established therebetween, a locked groove escape apparatus is provided. A transducer varies the position of the signal pickup in relation to the groove in a manner that opposes deviations of the relative speed from a predetermined speed. A carriage housing the pickup arm is mounted on the player base for movement between a playback mode and a standby mode. The carriage is driven radially inward in synchronization with rotation of the disc record during playback independent of radial motion of the signal pickup due to the spiral groove. A locked groove detector coupled to the transducer generates a locked groove recognition pulse when the signal pickup encounters a locked groove. A guide member is secured to the carriage contiguous to the free end of the pickup arm such that when the transducer drives the pickup arm in response to the locked groove recognition pulse against the guide member, a radially inward movement of the pickup arm is effected, whereby the signal pickup is relieved from the locked groove condition. In another embodiment of the present invention, a steering member is secured to the carriage adjacent the pickup arm such that the steering member and the disc record center are on the opposite sides of the pickup arm. When the signal pickup encounters a locked groove, the advancing steering member engages the pickup arm in order to effect radially inward movement thereof, thereby relieving the signal pickup from the locked groove condition.

5 Claims, 9 Drawing Figures

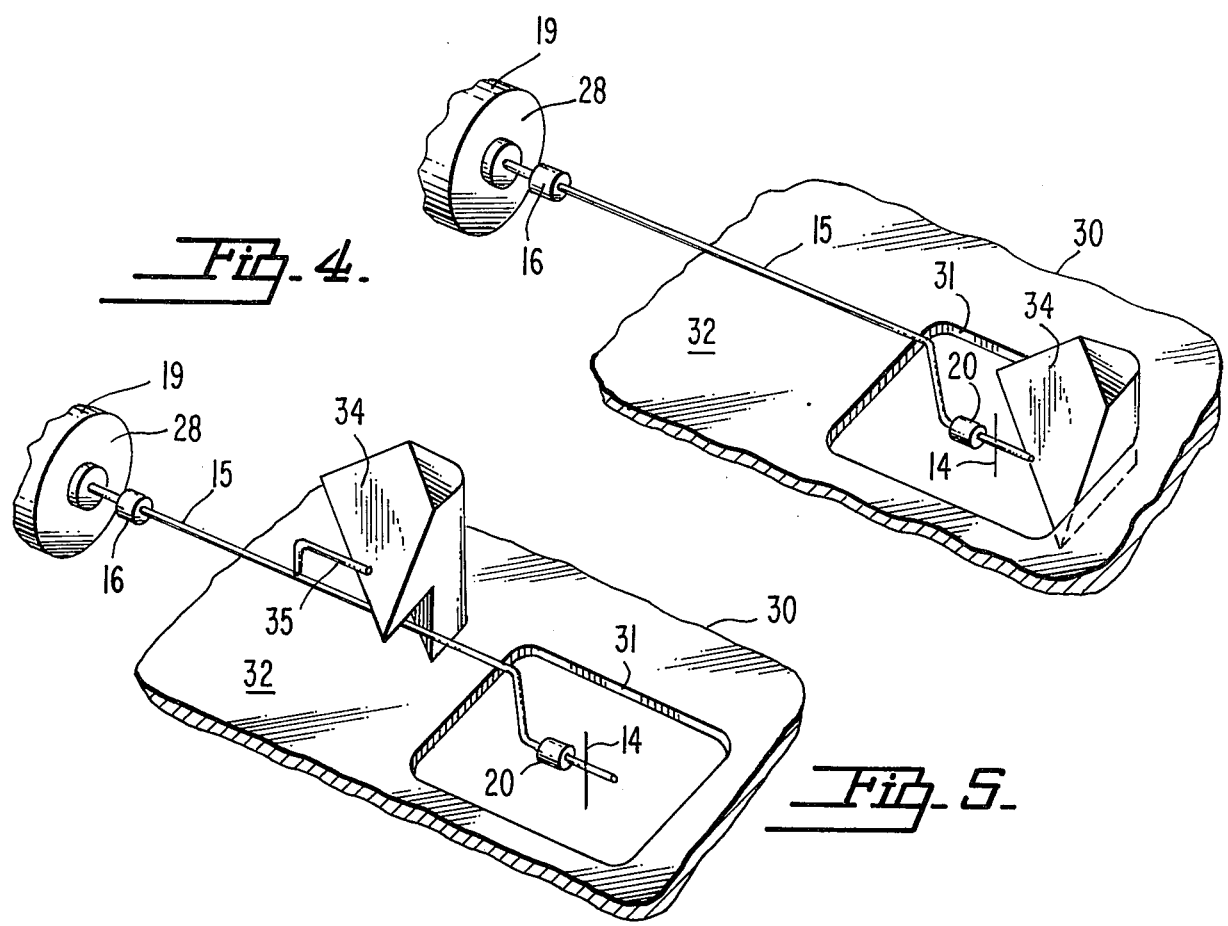
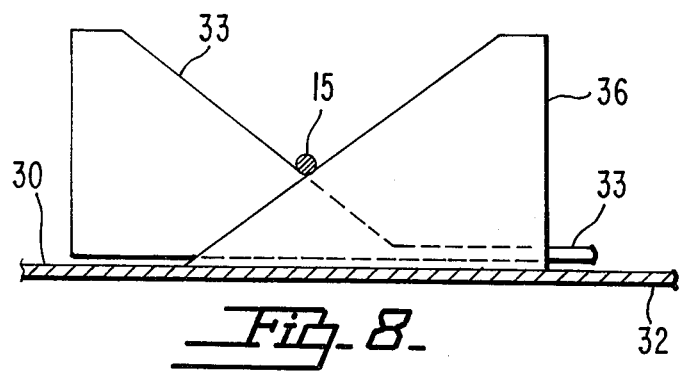
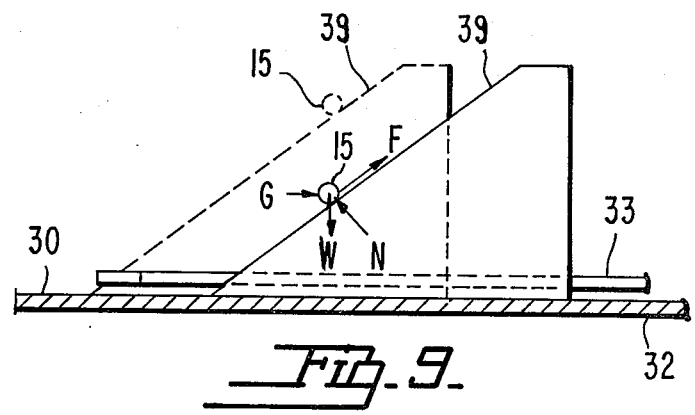

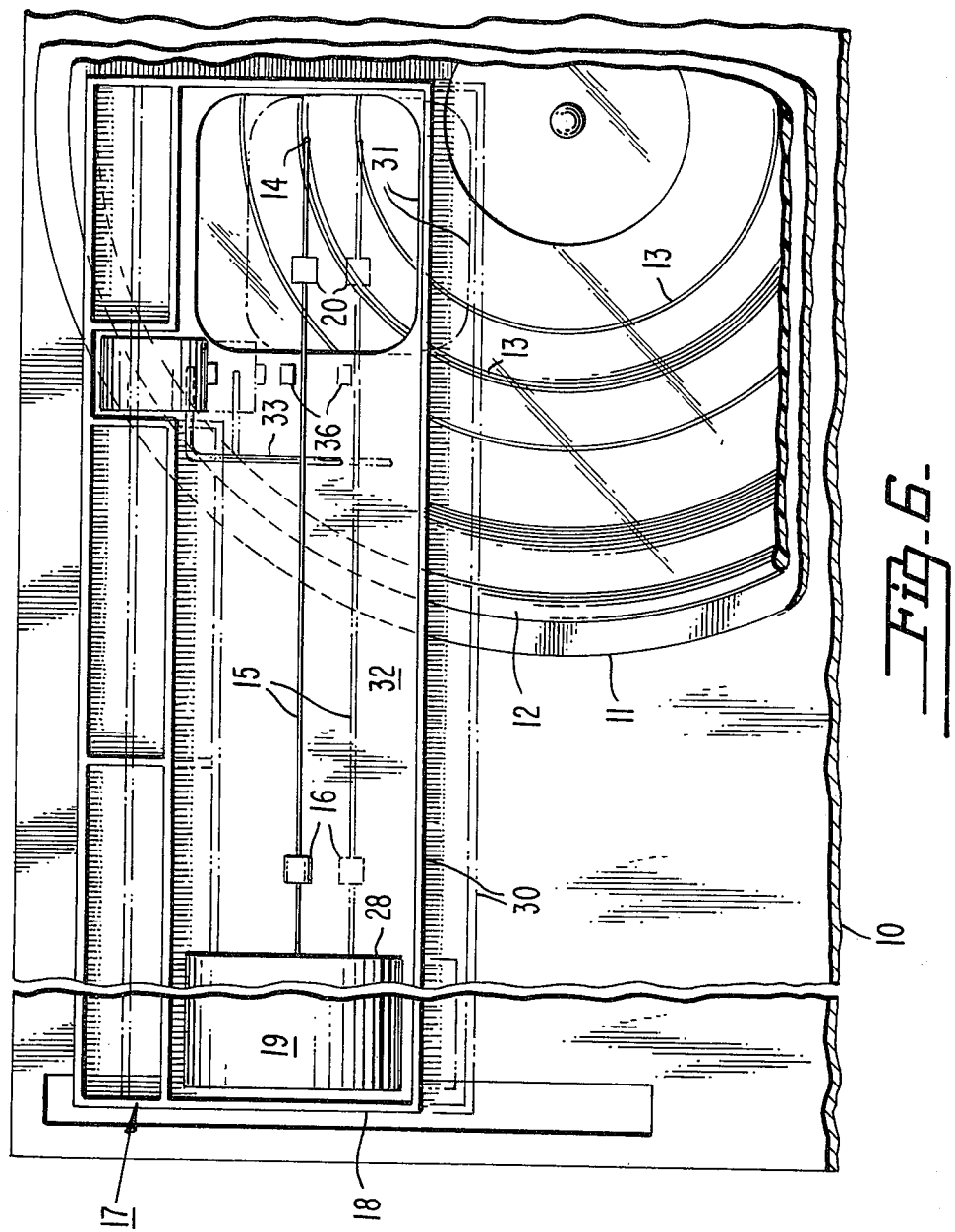

DISC RECORD LOCKED GROOVE ESCAPE APPARATUS

The present invention relates generally to a video disc record player, and more particularly, to an apparatus for relieving the signal pickup from a locked groove condition, if and when such a condition is encountered.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the pickup/record capacitance varies in response to the geometric variations in the bottom of the spiral groove. The capacitance variations are converted to electrical signal variations by suitable signal processing circuitry coupled to the pickup electrode. The output signal of the signal processing circuitry may be coupled to a conventional television receiver for reproduction. The other end of the pickup arm is releasably secured to a support member of a supporting structure of the playback system. A system of the aforementioned type is described in detail in U.S. Pat. No. 3,842,194, issued to J. K. Clemens on Oct. 15, 1974, and entitled INFORMATION RECORDS AND RECORDING/PLAYBACK SYSTEMS THEREFOR.

Video disc systems of the aforementioned type generally utilize disc records having groove densities in the order of 4000 to 8000 groove convolutions per inch. A typical video disc record of this type may have a groove convolution spacing in the order of 3.5 microns. The fragile walls of relatively narrow grooves of the disc record cannot be dependably relied upon to pull the weight of the pickup arm assembly, around the pickup arm pivot support, across the entire recorded surface of the disc record. Also in video disc systems utilizing variable capacitor concept, it is desirable for accurate reproduction of the prerecorded signals that the signal pickup electrode maintain a substantially constant attitude in the spiral groove. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the U.S. Pat. No. 3,870,835, issued to F. R. Stave, and entitled VIDEO DISC PLAYBACK APPARATUS, for an illustration of a suitable radial feed drive mechanism for providing the indicated radial motion.

Further, in the above-mentioned type video disc systems, it has been recognized that the relative motion between the disc record and the signal pickup should be maintained at a predetermined speed, and within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support member subject to cyclical, translatory motion along the longitudinal axis of the pickup arm in a manner that opposes deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, and entitled VELOCITY ADJUSTING SYSTEM.

It may be noted that the disc records having high groove densities (e.g., 4,000 to 8,000 grooves per inch) are subject to occasional flaws causing premature termination of the spiral groove. Such premature termination (commonly referred to as a "locked groove") may result in an undesired repetition of a particular groove convolution during disc record playback. It is therefore desirable to incorporate in a video disc player an apparatus suitable for relieving a signal pickup from a locked groove condition, when encountered.

In copending applications of (1) M. A. Leedom et al., Ser. No. 499,557, filed Aug. 22, 1974, entitled DISC RECORD GROOVE SKIPPER, and (2) H. N. Crooks, Ser. No. 522,818, filed Nov. 12, 1974, entitled DISC RECORD GROOVE SKIPPER APPARATUS, both assigned to the present assignee, arrangements for repositioning a signal pickup from one convolution to another of a spirally grooved disc record are described. The above-said arrangements employ a bimorph type element for producing special effects (e.g., stop action, fast forward, slow motion, etc.) and for relieving the signal pickup from the locked groove. The present invention is concerned simply with an apparatus for relieving a signal pickup from a locked groove condition, if and when such condition is encountered.

SUMMARY OF THE INVENTION

In a system for playing back prerecorded information from a spirally grooved disc record by a groove-engaging signal pickup secured to a pickup arm when relative speed is established therebetween, a locked groove escape apparatus is provided. Transducer means varies the position of the signal pickup in relation to the groove in a manner that opposes deviations of the relative speed from a predetermined speed. A carriage housing the pickup arm is mounted on the player base for movement between a playback mode and a standby mode. The carriage is driven radially inward in synchronization with rotation of the disc record during playback independent of radial motion of the signal pickup due to the spiral groove. Locked groove detector means coupled to the transducer means generates a locked groove recognition pulse when the signal pickup encounters a locked groove. A guide member is secured to the carriage adjacent the free end of the pickup arm such that when the transducer means drives the pickup arm in response to the locked groove recognition pulse against the guide member, a radially inward movement of the pickup arm is effected, thereby relieving the signal pickup from the locked groove condition.

In another embodiment of the present invention, a steering member is secured to the carriage adjacent the pickup arm such that the steering member and the disc record center are on the opposite sides of the pickup arm. When the signal pickup encounters a locked groove, the advancing steering member engages the pickup arm in order to effect radially inward movement thereof, whereby the signal pickup is relieved from the locked groove condition.

BRIEF DESCRIPTION OF THE DRAWINGS

Other objects, features, and advantages of the present invention will be more fully understood from the following detailed description of the preferred embodiment, the appended claims, and the accompanying drawings in which:

FIG. 4 is a perspective view of the first embodiment of the locked groove escape apparatus of FIGS. 2 and 3;

FIG. 5 is a perspective view of another version of the first embodiment of the locked groove escape apparatus of FIGS. 2, 3, and 4;

FIG. 6 is an exaggerated top view of the video disc player of FIG. 1, schematically illustrating a second embodiment of the locked groove escape apparatus pursuant to the principles of the present invention;

FIG. 8 illustrates diagrammatically an arrangement of a pickup arm lifting/lowering bracket and the steering member of the second embodiment of the locked groove escape apparatus; and FIG. 9 schematically illustrates initial upward shifting of a pickup arm carrying a signal pickup as the locked groove escape apparatus of FIGS. 1–7 attempts to effect radially inward movement of the pickup arm about its pivot support.

DETAILED DESCRIPTION OF THE PREFERRED EMBODIMENT

Figure 1:
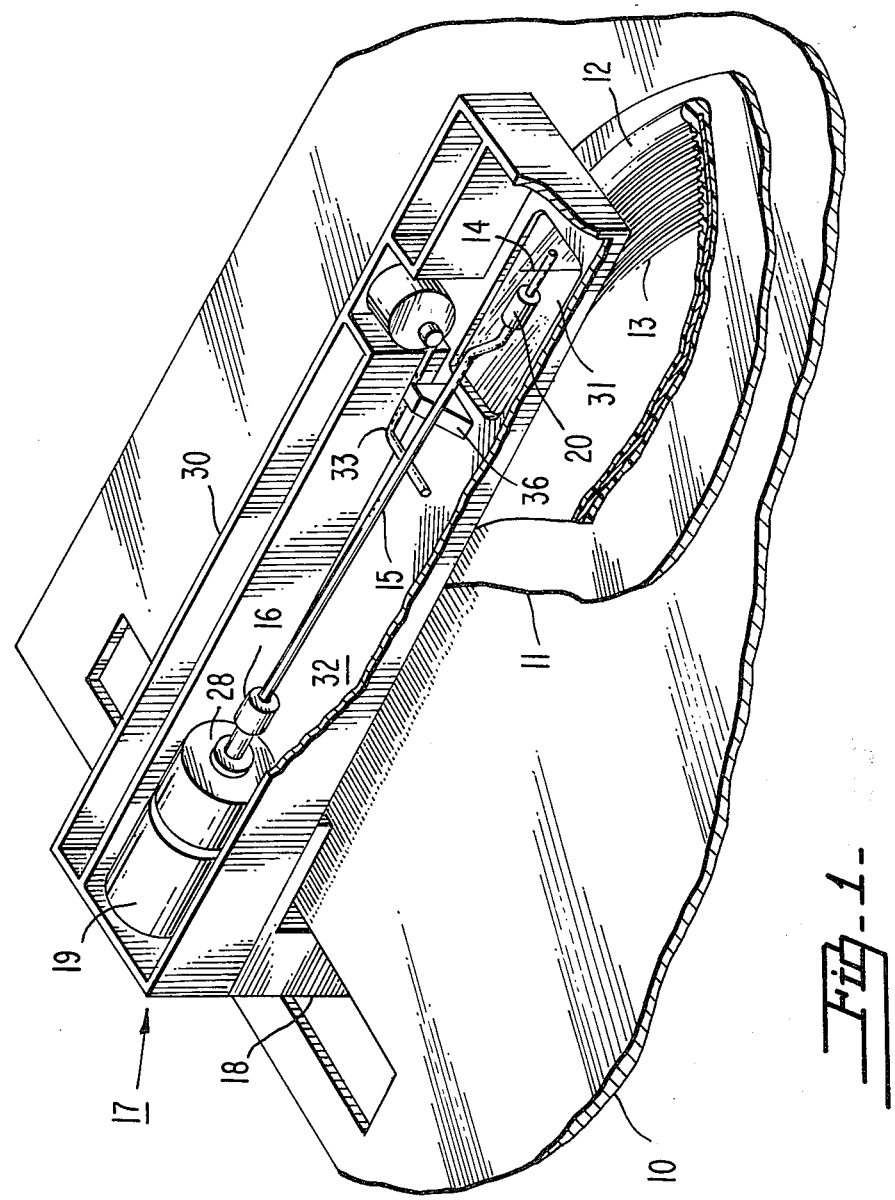
FIG. 1 illustrates a partially cut-away perspective view of a portion of a video disc player.
Figure 2:
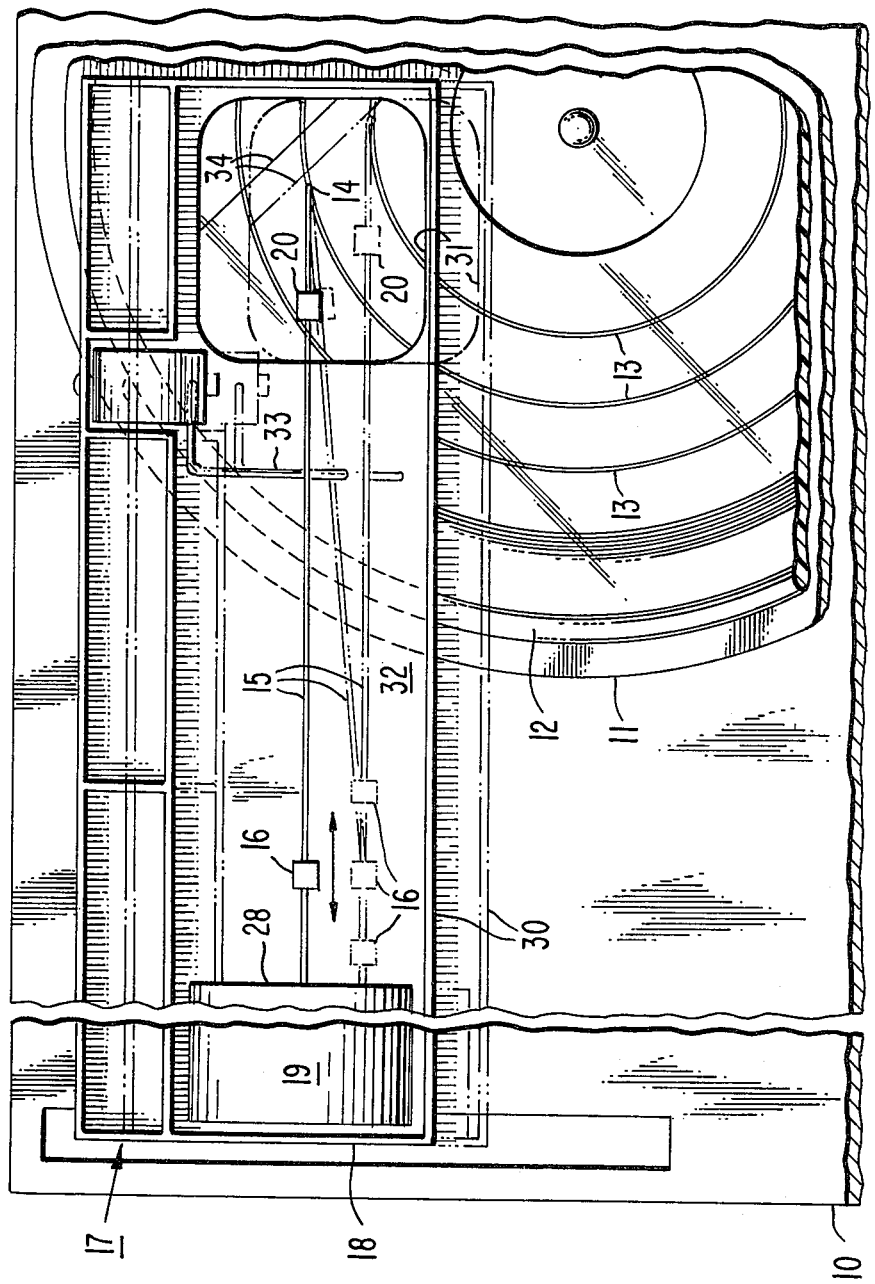
FIG. 2 is an exaggerated top view of a video disc player similar to that shown in FIG. 1, diagrammatically illustrating a first embodiment of the locked groove escape apparatus pursuant to the principles of the present invention.

FIGS. 1 and 2 illustrate a video disc player having a base 10. The player is suitable for use in a video disc system such as disclosed in the aforementioned Clemens patent. A turntable 11 is rotatably mounted on the base 10. The upper surface of the turntable 11 is adapted to support a video disc record 12. Video information is recorded by means of geometrical variations in the bottom of a smooth spiral groove 13 on the substrate of the disc record 12. The disc record 12 surface includes a conductive coating which is preferably covered with a thin deposit of dielectric material. A signal pickup 14, supported by a conductive pickup arm 15, engages the spiral groove 13 and includes a conductive electrode (not shown) which, together with the conductive coating and the dielectric deposit, form a capacitor. When relative motion is established between the signal pickup 14 and the disc record 12, an edge of the electrode included in the signal pickup, while riding in the smooth spiral groove 13, serves as an electrode of a capacitor varying due to the geometric variations in the bottom of the spiral groove passing underneath. The other end of the pickup arm 15 is releasably secured to a support member 16 carried by a pickup arm supporting structure 17, in the manner to be also described subsequently.

The pickup arm supporting structure 17 comprises a radial feed drive mechanism 18 and a translatory motion imparting means 19. As indicated before, the radial feed drive mechanism 18 traverses the pickup arm support 16 during playback independent of the motion of the signal pickup 14 due to the spiral groove 13, and in proper time relationship with the radial motion of the signal pickup tip engaged in the spiral groove so as to steadily maintain the longitudinal axis of the pickup arm substantially tangential to the spiral groove at the point of engagement. Reference may be made to the aforementioned Stave patent (U.S. Pat. No. 3,870,835) for an illustration of a suitable mechanism for providing the indicated radial motion.

Figure 3:
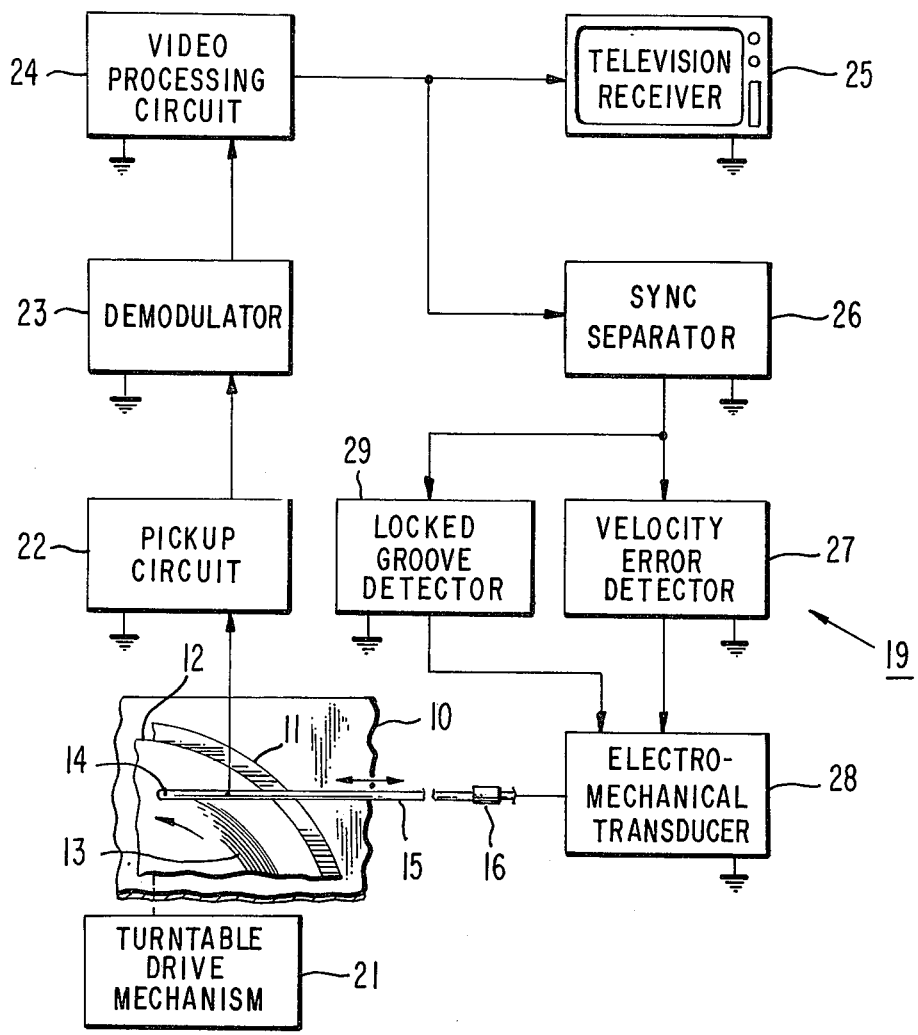
FIG. 3 illustrates, via a block diagram representation, the video disc player of FIG. 2 incorporating translatory motion imparting means for maintaining the pickup/record relative motion at a predetermined speed.

Reference is now made to FIG. 3 illustrating, via a block diagram representation, the general arrangement of a translatory motion imparting system for maintaining the pickup/record relative speed at a predetermined value. The spirally grooved video disc record 12 rests upon the turntable 11 which is rotated by a suitable rotational drive mechanism 21 at the desired predetermined speed (e.g., 450 rpm). A pickup circuit 22 is electrically coupled to the electrode (not shown) incorporated in the signal pickup 14, and serves to translate the pickup/record variations to electrical signal variations representative of the prerecorded signal. Illustratively, the pickup circuit may be of the advantageous form shown in the copending U.S. application of D. J. Carlson et al., Ser. No. 451,103, filed Mar. 14, 1974, entitled PICKUP APPARATUS FOR VIDEO DISC PLAYERS, and now U.S. Pat. No. 3,872,240.

The composite video signals appearing at the output of the pickup circuit 22 is supplied to a video signal processing circuit 24, via a demodulator 23. The video signal processing circuit 24 serves to process the demodulator 23 output to a form suitable for application to a conventional television receiver 25 for image display. Where the prerecorded composite video signal is representative of color pictures and incorporates a chrominance component of a "buried subcarrier" form, the video signal processing circuit 24 may be of the desirable form shown in the copending U.S. application of J. G. Amery, Ser. No. 506,446, filed on Sept. 16, 1974, and entitled COMB FILTER FOR VIDEO PROCESSING.

A sync separator 26, coupled to the output terminal of the video signal processing circuit 24, serves to separate the deflection synchronizing components from recovered composite prerecorded signal and develops a pulse train at its output corresponding to the horizontal synchronizing component of the prerecorded signal.

A velocity error detector 27, coupled to the sync separator 26, develops a direct voltage speed error correction signal at its output terminal having an amplitude which varies in response to the shifting frequency of the sync pulses (e.g., the detected horizontal sync pulse frequency vis-a-vis the standard frequency of 15.734 KHz) appearing at the output terminal of the sync separator 26. Illustratively, the velocity error detector 27 may be of the preferred form shown in the U.S. Pat. No. 3,711,641, issued to R. C. Palmer, on Jan. 16, 1973, and entitled VELOCITY ADJUSTING SYSTEM.

An electro-mechanical transducer 28 (also known as "armstretcher") mechanically coupled to the pickup arm 15 carrying the signal pickup 14 varies the position of the signal pickup in relation to the disc record groove in response to the speed error correction signal developed by the velocity error detector 27 in a manner that opposes deviations of the pickup/record relative speed from the predetermined speed (e.g., 450 rpm). Illustratively, the electro-mechanical transducer may be of the recommended form shown in U.S. pat. application Ser. No. B351,598, published for M. E. Miller et al., on Jan. 28, 1975, and entitled VELOCITY CORRECTION SYSTEM WITH DAMPING.

The support member 26 rigidly transmits the cyclical translatory motion of the electro-mechanical transducer 28 of the translatory motion imparting means 19 to the signal pickup 14, while accommodating vertical and lateral motion of the signal pickup in the spiral groove 13 due to the vertical and lateral runout (eccentricity) of the disc record 12. Reference may be made to the copending U.S. patent application of B. K. Taylor et al., Ser. No. 522,822, entitled PICKUP ARM MAGNETIC COUPLER, and now U.S. Pat. No. 3,917,903, for an illustration of a releasable coupling between the pickup arm 15 and the electro-mechanical transducer 28 of an advantageous form.

A box-like, conductive carriage 30 (shown in FIGS. 1 and 2 with its lid removed for clarity) is mounted to the supporting structure 17 for enclosing the conductive pickup arm 15. During playback, the pickup arm 15 is lowered through an opening 31 in the bottom wall 32 of the carriage 30 for permitting the signal pickup 14 to ride in the spiral groove 13 by a pivotally mounted lifting/lowering bracket 33. The bracket 33 lifts the free end of the pickup arm 15 to disengage the signal pickup 14 from the spiral groove 13, when the player is inoperative.

In the first embodiment (FIGS. 2, 4, and 5), a locked groove detector 29 is coupled to the electro-mechanical transducer 28, as illustrated in FIG. 3, of the translatory motion imparting means 19. Illustratively, the locked groove detector 29 may be of the advantageous form shown in the copending U.S. patent application of T. W. Burrus, Ser. No. 522,817, filed on Nov. 12, 1974, and entitled LOCKED GROOVE DETECTION AND CORRECTION IN VIDEO DISC PLAYBACK APPARATUS. Pursuant to the Burrus' system, when a locked groove condition is encountered in the playback of a video disc having sync signal recording locations non-radially aligned in successive groove convolutions, each initiation of a repeat reading of the same groove convolution results in a timing disturbance of the recovered sync signals. The disturbance is detected by an arrangement employing a phase locked loop responsive to the horizontal sync component of the prerecorded signal. A filtered voltage output of the phase locked loop is applied to a voltage comparator to effect discrimination against noise and minor, transitory timing disturbances. A stairstep voltage generator, responsive to the voltage comparator output, provides an output sufficient to trigger generation of a locked groove recognition pulse, when the voltage comparator threshold is exceeded a sufficient number of times within a selected time interval to verify an occurrence of a sustained locked groove behavior. To avoid a false generation of a locked groove recognition pulse under certain transient conditions (e.g., signal pickup set-down, signal pickup jump due to player jarring, et al.), a retriggerable one-shot multivibrator circuit is interposed between the voltage comparator and the stairstep voltage generator and provided with parameters aiding discrimination against the relatively high frequency repetitions of sync pulse timing disturbances that are associated with such transient conditions. A suitable locked groove escape apparatus, such as the electro-mechanical transducer 28, is activated to advance the signal pickup radially inward upon generation of a locked groove recognition pulse.

The first embodiment of the locked groove escape apparatus will now be described with reference to FIGS. 2 and 4. A guide member 34 is secured to the carriage 30 adjacent the free end of the pickup arm 15 such that when the electro-mechanical transducer 28 drives the pickup arm in response to the locked groove recognition pulse against the guide member, a radially inward movement of the pickup arm is effected whereby the signal pickup 14 is relieved from the locked groove condition. In order to prevent the engagement of the pickup arm 15 with the guide member 34 during normal operation of the transducer 28 in response to the speed error correction signal developed by the velocity error detector 27, the following arrangement may be made. First, the amplitude of the speed error correction signal may be limited within a given range. Second, the location of the guide member 34 in relation to the free end of the pickup arm 15 may be made such that the guide member/pickup arm engagement does not take place when the speed error correction signal causes a maximum displacement of the pickup arm.

FIG. 5 is a perspective view of another version of the first embodiment of the locked groove escape apparatus of FIGS. 2 and 4. In the arrangement of FIG. 5, the guide member 34 is mounted inside the carriage 30 for engagement with an extension member 35 attached to the pickup arm 15 in order to completely conceal the locked groove escape apparatus within the carriage.

The second embodiment of the locked groove escape apparatus will now be described with reference to FIG. 6. A steering member 36 is secured to the carriage 30 adjacent to the pickup arm 15 such that the steering member and the center of the disc record 12 are on the opposite sides of the pickup arm. When the signal pickup 14 encounters a locked groove, the steering member 36 advancing with the carriage 30 engages the pickup arm 15 in order to effect radially inward movement thereof, whereby the signal pickup is relieved from the locked groove condition.

Figure 7:
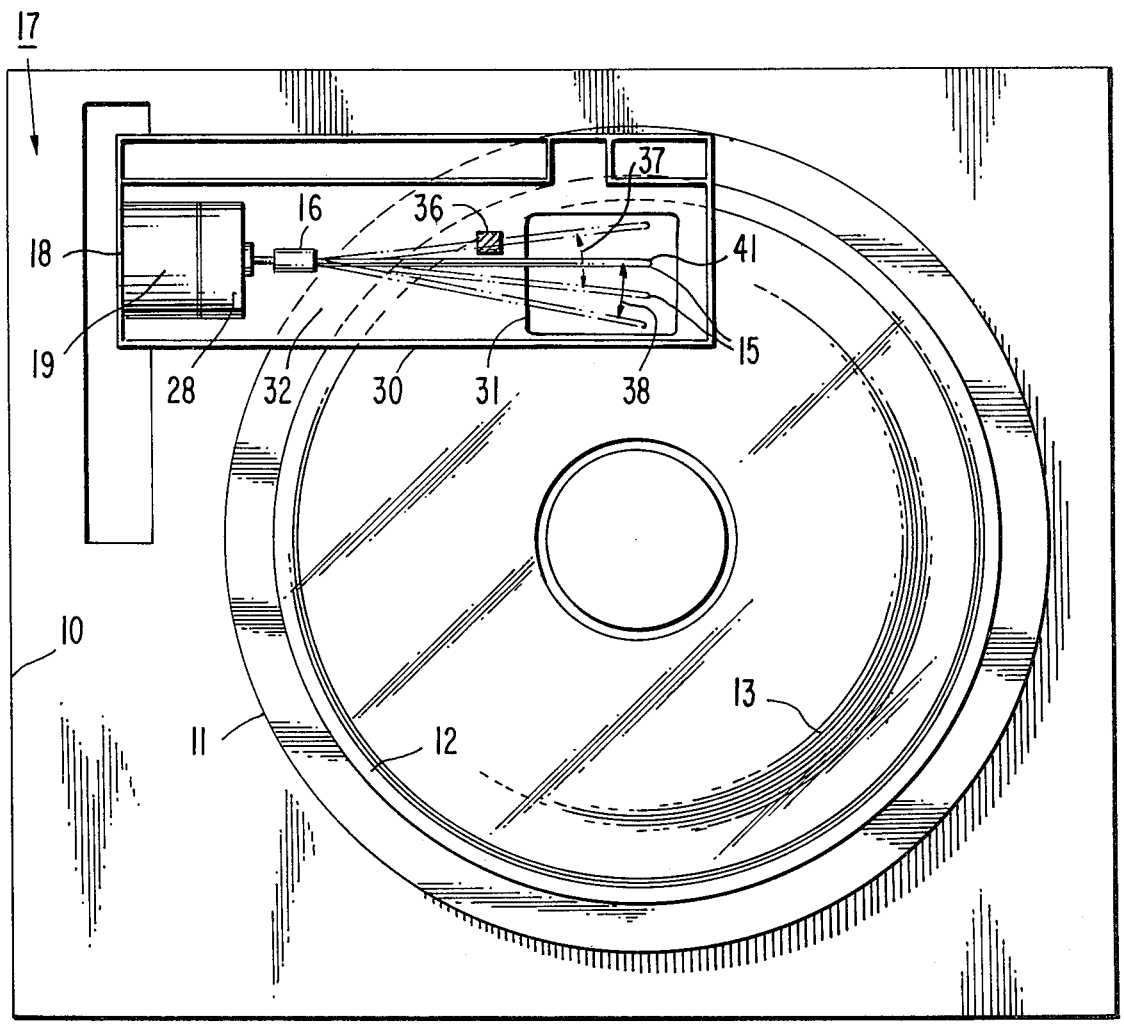
FIG. 7 schematically illustrates the self adjustment of the clearance between a pickup arm and a steering member of the second embodiment of the locked groove escape apparatus due to the eccentricity of the disc record.

FIG. 7 schematically illustrates the self adjustment of the clearance between the pickup arm 15 and the steering member 36 of the second embodiment of the locked groove escape apparatus due to the eccentricity of the disc record 12. The disc record eccentricity (illustratively, in the range of 0.01 to 0.06 inches) results due to several reasons: For example, (1) disc record manufacturing variations, (2) disc record warpage, and (3) turntable and drive mechanism mounting eccentricity, etc., to name a few. The disc record groove eccentricity may be lateral and/or vertical. The lateral and vertical disc record groove eccentricities cause the pickup arm 15 to oscillate back and forth, as illustrated in FIG. 7, when the pickup arm is lowered to effect the engagement of the signal pickup 14 in the disc record groove 13 for playback. If the guide member 36 were absent, the pickup arm 15 would have traversed an arc 37 as shown by the dotted lines in FIG. 7 due to the disc record groove eccentricity. However, because of the steering member 36, the pickup arm 15 is shifted radially inward (i.e., the signal pickup is displaced into an inner groove convolution), and the pickup arm now traverses an arc 38. In this position the pickup arm 15 barely touches the steering member 36 during its outward swing, whereby a minimum clearance is established between the pickup arm and the steering member. The minimum clearance for a given eccentricity of the disc record is the smallest spacing between the pickup arm 15 and the steering member 36 which would permit the pickup arm to oscillate back and fourth without hindrance from the steering member and yet assure an early relief of the signal pickup 14 from the locked groove condition. The chronology of the events is as follows: When the signal pickup 14 encounters a locked groove, the pickup arm 15 repetitively bumps into the steering member 36 during its outward swings as the steering member advances into the path of the arc traversed by the pickup arm. As the steering member 36 advances further and further into the path of the pickup arm 15, the force exerted by the steering member on the pickup arm gradually increases. When this force exceeds a certain value determined by the mass, damping, and the stiffness of the pickup arm assembly, the pickup arm 15 is shifted radially inward, and the signal pickup 14 is thereby relieved from the locked groove condition.

It is important to note that the minimum clearance is a function of the disc record eccentricity and, therefore, varies for each record. The locked groove escape apparatus, pursuant to the principles of the present invention, automatically develops the minimum clearance between the steering member 36 and the pickup arm 15 when the pickup arm is initially lowered to effect the engagement of the signal pickup 14 with the disc record groove 13 for playback.

In order to obtain the minimum clearance between the steering member 36 and the pickup arm 15, it is necessary that the initial spacing between the steering member and the pickup arm is such that the pickup arm will at least barely engage the steering member during its outward swing when the pickup arm is lowered for playback. The aforesaid requirement may be met by proper positioning of the pickup arm pivot support 16 with respect to the steering member 36. Other arrangements for fulfilling the aforesaid requirement are as follows: First, the pickup arm 15 can be lightly biased toward the steering member 36. Second, the pickup arm lifting/lowering bracket 33 can be slanted as shown in FIG. 8 toward the steering member 36 to assure initial contct between the steering member and the pickup arm 15.

FIG. 9 schematically illustrates initial upward shifting of the pickup arm 15 carrying the signal pickup 14 prior to radially inward displacement of the pickup arm as the locked groove escape apparatus of FIGS. 1–7 attempts to effect radially inward movement of the pickup arm about its pivot support 16. The surface 39 of the guide member 34 and the steering member 36 engaging the pickup arm 15 when the signal pickup 14 encounters a locked groove are slanted in a manner that reduces the signal pickup/record frictional forces as the respective members effect radially inward movement of the pickup arm, whereby the disc record life is extended. In FIG. 9, (1) W is the weight of the pickup arm assembly, (2) N is the normal reaction of the member surface 39, (3) G is the radially outward force initially exerted by the groove 13 on the pickup arm 15 via the signal pickup 14, and (4) F is the frictional force between the pickup arm and the member surface. The upward component of the normal reaction N reduces the tracking force between the signal pickup 14 and the groove 13, and thereby enhances the disc record 12 life.

Thus, it may be seen that the locked groove escape apparatus of the present invention relieves the signal pickup from a locked groove condition, if and when such a condition is encountered.

What is claimed is:

1. In a system for playing back prerecorded signals from a spirally grooved disc record by a groove-engaging signal pickup secured to a pickup arm when relative speed is established therebetween, the playback system including a base; a locked groove skipper comprising:
  a carriage mounted on the base for movement between a playback mode and a standby mode;
  means for driving the carriage radially inward in synchronization with rotation of the disc record during playback independent of radial motion of the signal pickup due to the spiral groove;
  means for pivotally supporting the pickup arm in the carriage;
  means for lowering the pickup arm in order to effect the engagement of the signal pickup with the spiral groove of the disc record for playback; and
  a steering member secured to the carriage adjacent the pickup arm such that the steering member and the disc record center are on the opposite sides of the pickup arm, wherein the location of the steering member relative to the lowered position of the pickup arm is such that a minimum clearance is developed between the steering member and the pickup arm upon initial lowering of the pickup arm for playback due to the disc record lateral eccentricity; and such that when the signal pickup encounters a locked groove, the advancing steering member engages the pickup arm to effect radially inward movement thereof, whereby the signal pickup is relieved from the locked groove.

2. A system as defined in claim 1 wherein the lowering means includes a bracket pivotally mounted on the carriage for lowering the pickup arm for initiating a playback and lifting the pickup arm after the playback, and wherein the bracket is slanted toward the steering member in a manner that ensures development of the minimum clearance between the pickup arm and the steering member as the pickup arm is lowered to initiate a playback.

3. A system as defined in claim 1 wherein the steering member surface engaging the pickup arm when the signal pickup encounters a locked groove is slanted in a manner that reduces the pickup/record frictional force as the steering member effects radially inward movement of the pickup arm, thereby extending the life of the disc record.

4. A system as defined in claim 3 wherein the pickup arm is lightly biased against the steering member in order to ensure development of the minimum clearance between the pickup arm and the steering member as the pickup arm is lowered to initiate a playback.

5. In a system for playing back prerecorded signals from a spirally grooved disc record by a groove-engaging signal pickup secured to a pickup arm when relative speed is established therebetween, the playback system including a base; a locked groove skipper comprising:

a carriage mounted on the base for movement between a playback mode and a standby mode;

means for driving the carriage radially inward in synchronization with rotation of the disc record during playback independent of radial motion of the signal pickup due to the spiral groove;

means for pivotally supporting the pickup arm in the carriage;

means for lowering the pickup arm in order to effect the engagement of the signal pickup with the spiral groove of the disc record for playback; and a steering member secured to the carriage adjacent the pickup arm such that the steering member and the disc record center are on the opposite sides of the pickup arm; wherein the location of the steering member relative to the lowered position of the pickup arm is such that when the signal pickup encounters a locked groove, the advancing steering member engages the pickup arm in order to effect radially inward movement thereof, whereby the signal pickup is relieved from the locked groove; and wherein the steering member surface engaging the pickup arm when the signal pickup encounters a locked groove is slanted in a manner that reduces the pickup/record frictional force as the steering member effects radially inward movement of the pickup arm, thereby extending the life of the disc record.

* * * * *